(12) United States Patent
Brown et al.

(10) Patent No.: US 12,027,969 B2
(45) Date of Patent: Jul. 2, 2024

(54) ACTIVE FILTER FOR SINGLE PHASE CHARGING USING A SWITCH-MODE CONVERTER

(71) Applicant: HELLA GmbH & Co. KGaA, Lippstadt (DE)

(72) Inventors: Alan Wayne Brown, Canton, MI (US); Philip Michael Johnson, Brighton, MI (US)

(73) Assignee: HELLA GmbH & Co. KGaA, Lippstadt (DE)

( * ) Notice: Subject to any disclaimer, the term of this patent is extended or adjusted under 35 U.S.C. 154(b) by 626 days.

(21) Appl. No.: 17/287,428

(22) PCT Filed: Oct. 23, 2019

(86) PCT No.: PCT/IB2019/059080
§ 371 (c)(1),
(2) Date: Apr. 21, 2021

(87) PCT Pub. No.: WO2020/089739
PCT Pub. Date: May 7, 2020

(65) Prior Publication Data
US 2021/0399624 A1    Dec. 23, 2021

Related U.S. Application Data

(60) Provisional application No. 62/754,641, filed on Nov. 2, 2018.

(51) Int. Cl.
*H02M 1/15* (2006.01)
*B60L 53/22* (2019.01)
(Continued)

(52) U.S. Cl.
CPC ............. *H02M 1/15* (2013.01); *B60L 53/22* (2019.02); *H02J 7/02* (2013.01); *H02M 1/10* (2013.01);
(Continued)

(58) Field of Classification Search
CPC ........ H02M 1/15; H02M 1/10; H02M 1/4208; H02M 1/4216; H02M 3/33573;
(Continued)

(56) References Cited

U.S. PATENT DOCUMENTS 9,729,066 B1 *  8/2017  Lu et al. ................. H02M 1/14
2017/0349053 A1 * 12/2017  Landseadel ............... H02J 7/02
2019/0291585 A1 *  9/2019  Yang ........................ H02J 3/18

FOREIGN PATENT DOCUMENTS

EP    3 242 382    11/2017

OTHER PUBLICATIONS

Krismer, F. et al., "Efficiency-Optimized High-Current Dual Active Bridge Converter for Automotive Applications", IEEE Transactions on Industrial Electronics, Jul. 1, 2012, pp. 2745-2760, XP011417615, vol. 59, No. 7.

(Continued)

*Primary Examiner* — David V Henze-Gongola
(74) *Attorney, Agent, or Firm* — WARNER NORCROSS + JUDD LLP (57) ABSTRACT

A converter for electrical connection to a three-phase electrical grid and a single-phase electrical grid is provided. The converter includes three DAB modules, each for converting a respective alternating current of a three-phase electrical grid. When connected to a single-phase electrical grid, the third DAB module is bi-directional such that it is operable to filter the power output of the first and second DAB modules. The converter further includes a filter capacitor in electrical communication with the third DAB module (Continued)

through a relay, wherein the relay is responsive to a controller to couple the third DAB module to the filter capacitor when the single-phase electrical grid is detected and to couple the third DAB module to a grid rectifier when the three-phase electrical grid is detected.

15 Claims, 9 Drawing Sheets

(51) Int. Cl.
  *H02J 7/02* (2016.01)
  *H02M 1/10* (2006.01)
  *H02M 1/42* (2007.01)
  *H02M 1/44* (2007.01)
  *H02M 3/335* (2006.01)
  *H02M 7/219* (2006.01)

(52) U.S. Cl.
  CPC ....... *H02M 1/4208* (2013.01); *H02M 1/4216* (2013.01); *H02M 3/33573* (2021.05); *H02M 3/33584* (2013.01); *H02M 7/219* (2013.01); *B60L 2210/30* (2013.01); *H02J 2207/20* (2020.01); *H02M 1/44* (2013.01)

(58) Field of Classification Search
  CPC .. H02M 3/33584; H02M 7/219; H02M 1/007; B60L 53/22; B60L 2210/30; H02J 7/02; H02J 2207/20; H02J 3/26; H02J 7/345; Y02T 10/72; Y02T 10/92; Y02T 90/14; Y02T 90/16
  See application file for complete search history.

(56) References Cited

OTHER PUBLICATIONS

Mehta, P. et al., "Switched—Capacitor Filters", Proceedings of the Annual Power Electronics Specialists Conference, IEEE, Jun. 26-29, 1989, pp. 392-399, XP000044311.
International Search Report and Written Opinion of PCT/IB2019/059080 mailed on Dec. 18, 2019, total of 15 pages.

* cited by examiner

ACTIVE FILTER FOR SINGLE PHASE CHARGING USING A SWITCH-MODE CONVERTER

CROSS-REFERENCE TO RELATED APPLICATION

This application claims the benefit of U.S. Provisional Application 62/754,641, filed Nov. 2, 2018, the disclosure of which is incorporated by reference in its entirety.

FIELD OF THE INVENTION

The present invention relates to an active filter using a bi-directional switch-mode converter for an electric vehicle on-board charger.

BACKGROUND OF THE INVENTION

Electric vehicles include a battery for powering an electric drive system. Plug-in electric vehicles are a category of electric vehicles having a rechargeable battery pack that can be recharged from the electrical grid. Because most electrical grids provide an AC voltage, and because most rechargeable battery packs require a DC voltage, power from the electrical grid must first be converted into a suitable DC voltage when recharging an electric vehicle.

A variety of circuits exist for converting an AC voltage from an electrical grid into a DC voltage for a rechargeable battery. One known circuit includes a dual-active-bridge (DAB) converter. The DAB converter receives a DC voltage from a front end rectifier and outputs to a DC link capacitor. In operation, its DC input is inverted by a primary-side bridge and rectified by a secondary-side bridge. The DAB converter is typically operated by a controller to regulate the magnitude of the DC output in accordance with battery charging requirements.

Electrical grids exist as three-phase electrical grids or single-phase electrical grids, often changing between the two. While high-power charging is more ideally suited to a three-phase electrical grid than a single-phase electrical grid, the latter may be the only option available. It is therefore desirable to have an on-board charger that can support both grid types. In particular, it is desirable to have an on-board charger that removes second-order harmonics during single-phase charging to provide a purely DC output from a single-phase electrical grid.

SUMMARY OF THE INVENTION

An on-board charger having a dual-purpose switch-mode converter for electrical connection to a three-phase electrical grid and a single-phase electrical grid is provided. When connected to a three-phase electrical grid, three switch-mode converters, for example three DAB converters, convert a rectified voltage to produce direct current at the output. When connected to a single-phase electrical grid, the third switch-mode converter is bi-directional such that it is operable to filter the power output of the first and second switch-mode converters and thereby maintain direct current at the output. The on-board charger includes a filter capacitor in electrical communication with the third switch-mode converter through a relay. The relay is responsive to a controller to couple the third switch-mode converter to the filter capacitor when the single-phase electrical grid is detected and to couple the third switch-mode converters to the third phase of the electrical grid when the three-phase electrical grid is detected.

In one embodiment, the on-board charger includes a first DAB converter, a second DAB converter, and a third DAB converter, each being operable to convert a rectified voltage into a DC component when coupled to a three-phase electrical grid. When coupled to a single-phase electrical grid, however, the input stage of the third DAB converter is coupled to a filter capacitor as an active filter to remove harmonics from the DC output of one or both of the first and second DAB converters. In particular, the filter capacitor draws power from the DC output through the third DAB converter if the DC output is greater than a power reference and supplies power to the DC output through the third DAB converter if the DC output is less than the power reference. The input stage of each DAB converter is electrically coupled to a rectifier, optionally a full-bridge rectifier. A relay alternatively couples the input stage of the third DAB converter to the rectifier or to the filter capacitor, depending on whether a single-phase electrical grid or a three-phase electrical grid is detected.

In another embodiment, a method of operation is provided. The method includes determining the presence of a single-phase electrical grid or a three-phase electrical grid at the input of the on-board charger. If a three-phase electrical grid is detected, a controller operates a first rectifier and a first DAB converter to convert a first phase of the AC input into a first DC component, operates a second rectifier and a second DAB converter to convert a second phase of the AC input into a second DC component, and operates a third rectifier and a third DAB converter to convert a third phase into a second DC component. If a single-phase electrical grid is detected, the controller causes the third DAB converter to decouple from the third rectifier and couple to a filter capacitor. The controller further causes the third DAB converter to operate as an active filter of the DC output of the first and second DAB converters, such that the filter capacitor draws power from the DC output through the third DAB converter if the DC output is greater than a power reference and supplies power to the DC output through the third DAB converter if the DC output is less than the power reference.

In single-phase operation, the third DAB converter functions as the switch-mode and inductive elements of an output active filter to cancel second-order harmonics in a single-phase system. By using one DAB converter as an active filter, the hardware utilization of the entire system is maximized while the number of additional hardware and software requirements are minimized. The inductive component of the active filter is provided by the transformer of the DAB converter, and the output sensors to control the reactive power are already in place for three-phase operation. Furthermore, because the control algorithm for the DAB converter can be modulated bi-directionally through zero power, only a new power references need be applied to the same open loop algorithm, meaning the control loop maintaining the capacitor voltage can be designed using the same transfer function as the other two modules.

An advantage of positioning a relay between a grid rectifier and the converter modules is that the relay allow the grid rectifier to short its unused phase to neutral and add an additional conduction path to the neutral line. When switching from three-phase to single-phase operation, if one converter is used as an active filter while the other two work in parallel to supply power to the output, the neutral connection must handle the return current of both phase connections. By shorting the neutral to the third, unused phase, through the unused rectifier, balance is restored to the current distribution between the neutral and phase connections.

These and other features and advantages of the present invention will become apparent from the following description of the invention, when viewed in accordance with the accompanying drawings and the appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENT

Figure 1:
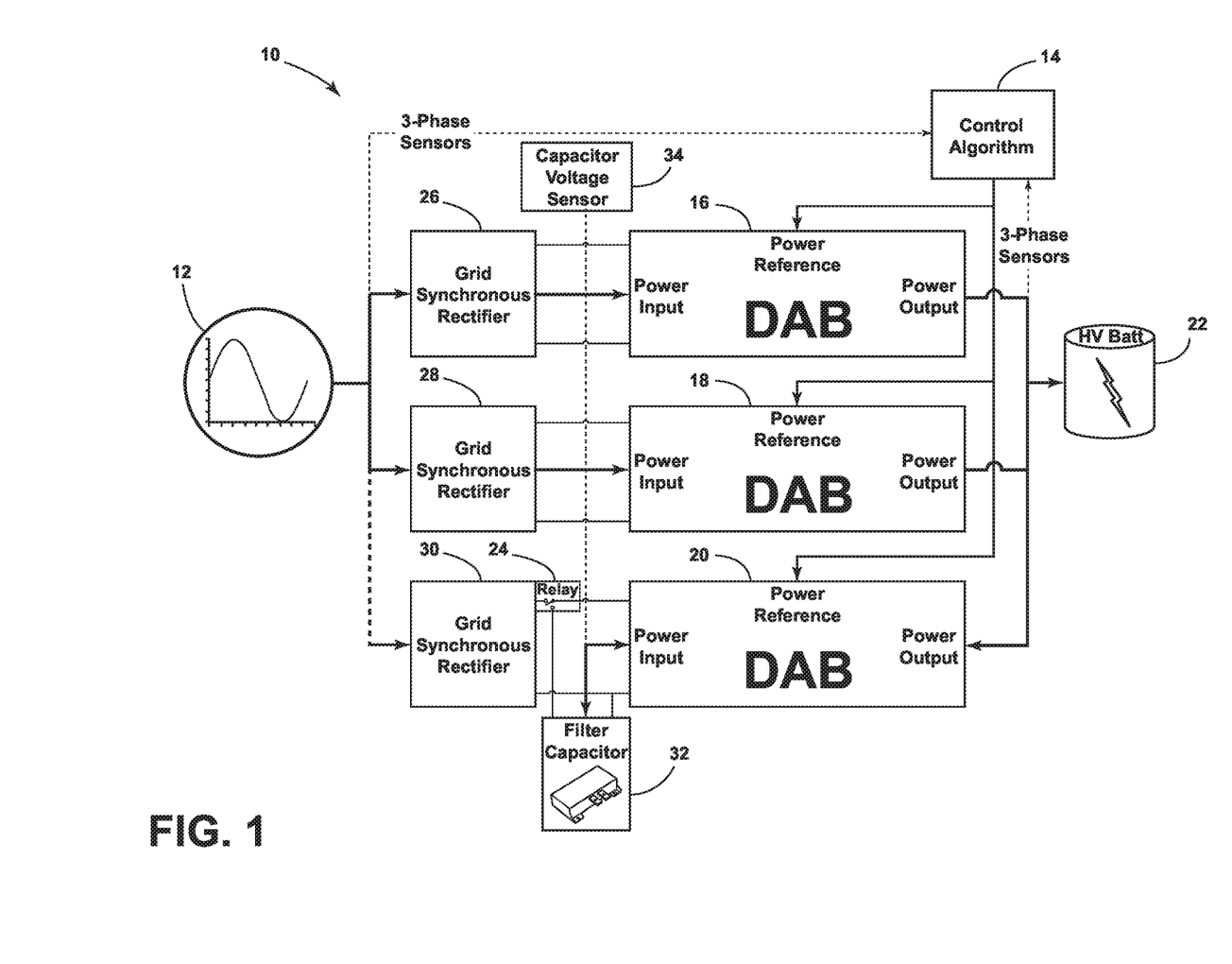
FIG. 1 is a circuit diagram of a three-phase/single-phase, single stage on-board charger for a vehicle battery.

Referring now to FIG. 1, a three-phase/single-phase on-board charger (OBC) is illustrated and generally designated 10. As discussed below, one DAB module of the OBC 10 is optionally used as the switch-mode and inductive elements of an output active filter and employs a single relay on the primary, high-side DC linkage to dynamically switch from a three-phase configuration when only a single-phase connection is detected.

More specifically, the OBC 10 is coupled to a three-phase electrical grid or a single-phase electrical grid 12. The OBC 10 includes a controller 14 for providing control signals to each of three DAB module 16, 18, 20, each with eight controllable switches. The controllable switches of the DAB modules 16, 18, 20 are operated by the controller 14 to provide a DC voltage to a battery 22, for example a vehicle battery. The controller 14 is also operable to detect a single-phase connection and a three-phase connection and is operable to control operation of one or more relays 24 coupled to a filter capacitor 32. Three grid synchronous rectifiers 26, 28, 30 provide a varying DC voltage to each DAB module 16, 18, 20.

During three-phase operation, each DAB module 16, 18, 20 is responsible for power factor correction of a single alternating current. The resulting DC output is achieved through the combination of all three DAB outputs. When applied to a three-phase grid, the isolated AC/DC system can take advantage of the 120° shift between each phase of the grid voltage. When the phase shift is 120° and the amplitude is equivalent between each voltage sinusoid, the grid is said to be balanced. This means that the sum of all three-phase voltages at any time t will be equal to zero as will, by extension, the phase currents and all their harmonics, given a unity power factor.

During single-phase operation, and to cancel the second-order harmonic in a single-phase system, one DAB module 20 from the three-phase system is dynamically repurposed as the switch-mode and inductive elements of an output active filter. Once connected to the filter capacitor 32, optionally a capacitor bank, the solo DAB module is operated bi-directionally, about 180° out of phase with the other two DAB modules 16, 18 to achieve active filtering. While three possible embodiments are shown in FIGS. 1 through 3, the embodiment of FIG. 1 is most advantageous for its lower conduction losses and additional separation from the grid, and is therefore discussed in further detail below.

By using one module 20 as an active filter, the hardware utilization of the entire system is maximized while the number of additional hardware and software requirements are minimized. Only the relay mechanism 24, filter capacitor 32, and a voltage sensor 34 across the filter capacitor 32 are required in addition to the existing hardware for three-phase operation. No additional PWM channels, only one additional ADC channel, and potentially as few as one additional GPIO output are required from the primary controller. The inductive component of the active filter is provided by the transformer and the output sensors to control the reactive power are already in place for three-phase operation. Furthermore, because the control algorithm can be modulated bi-directionally through zero power, only a new power references need be applied to the same open loop modulation algorithm, meaning the control loop maintaining the capacitor voltage can be designed using the same transfer function as the other two modules.

Figure 2:
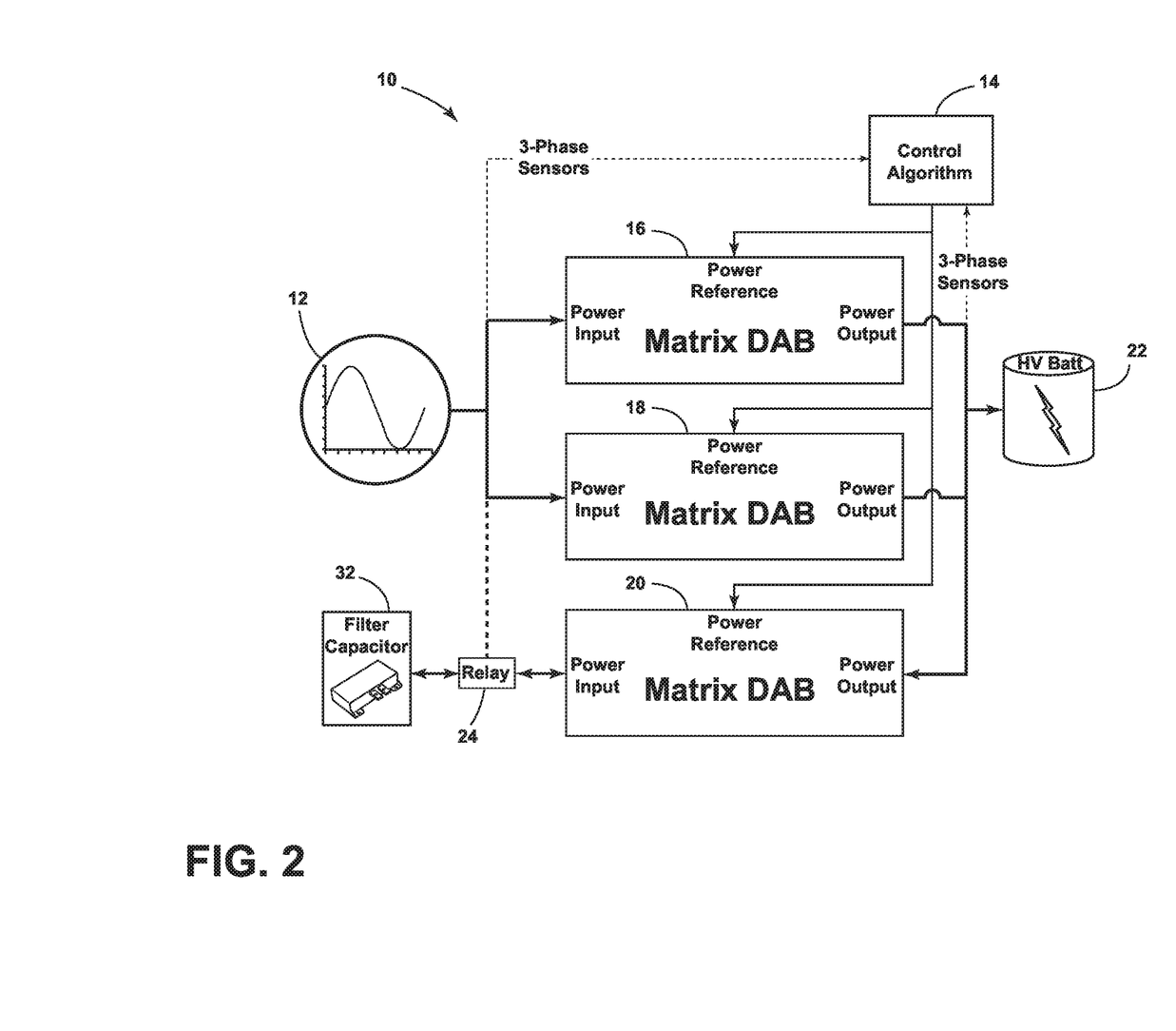
FIG. 2 is a circuit diagram of a first alternative embodiment of the on-board charger of FIG. 1.
Figure 3:
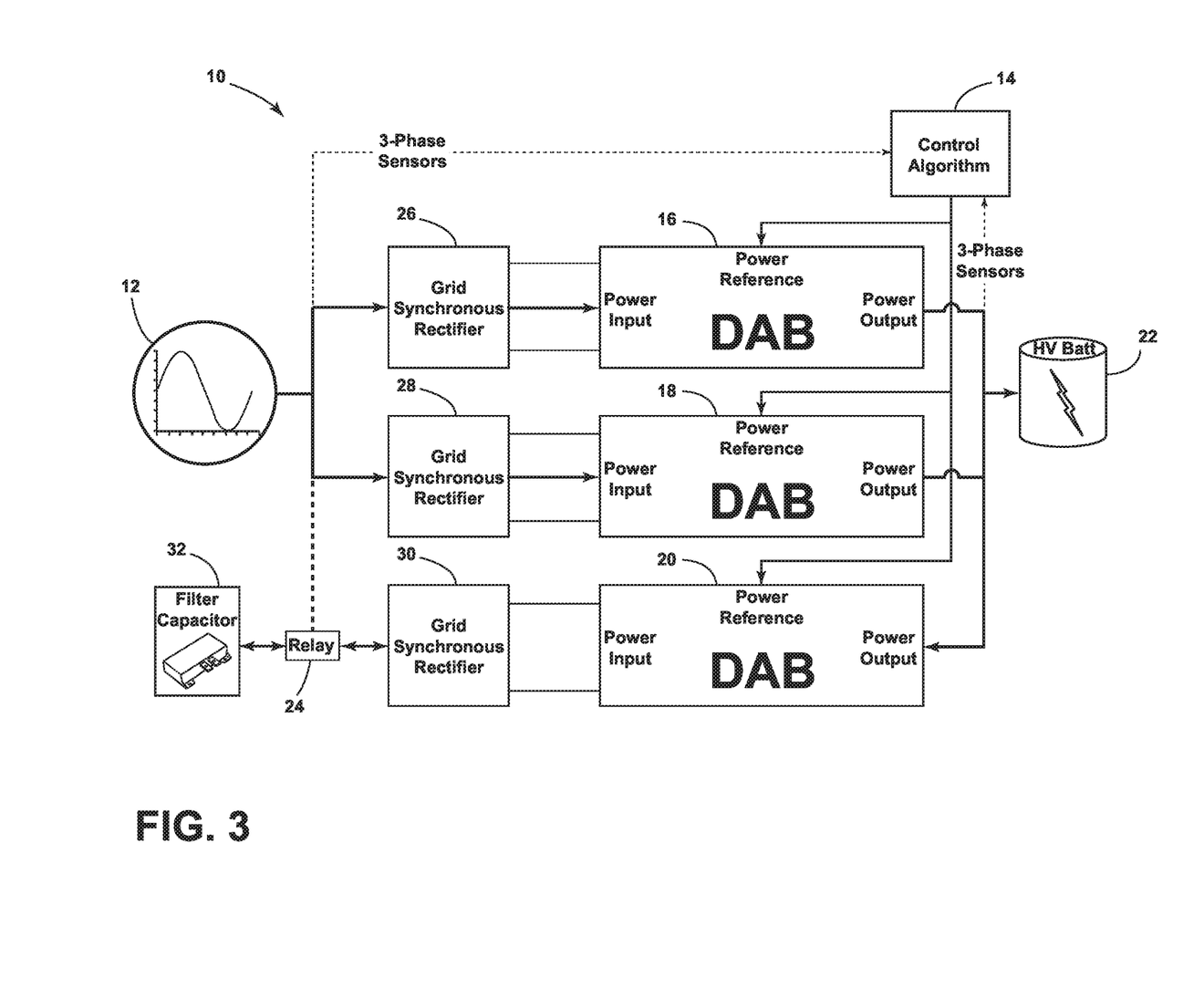
FIG. 3 is a circuit diagram of a second alternative embodiment of the on-board charger of FIG. 1.

An on-board charger 10 in accordance with a second embodiment is illustrated in FIG. 2. This is embodiment differs from the embodiment of FIG. 1 in that the primary-side full bridge of each DAB 16, 28, 20 now includes a matrix converter having multiple bidirectional semiconductor switches for each phase of the electrical grid 12. In addition, the filter capacitor 32 is connected to the input side of the matrix converter for the third DAB, or "Matrix DAB 20" as depicted in FIG. 2. As also shown in FIG. 3, the filter capacitor 32 is connected to the input side of the third grid synchronous rectifier 30. The embodiments of FIGS. 2 and 3 are otherwise functionally similar to the embodiment of FIG. 1, in that each Matrix DAB or each DAB module is responsible for power factor correction of a single alternating current when connected to a three-phase grid, with one Matrix DAB or DAB module being repurposed as the switch-mode and inductive element of an active filter when connected to a single-phase grid.

Figure 4:
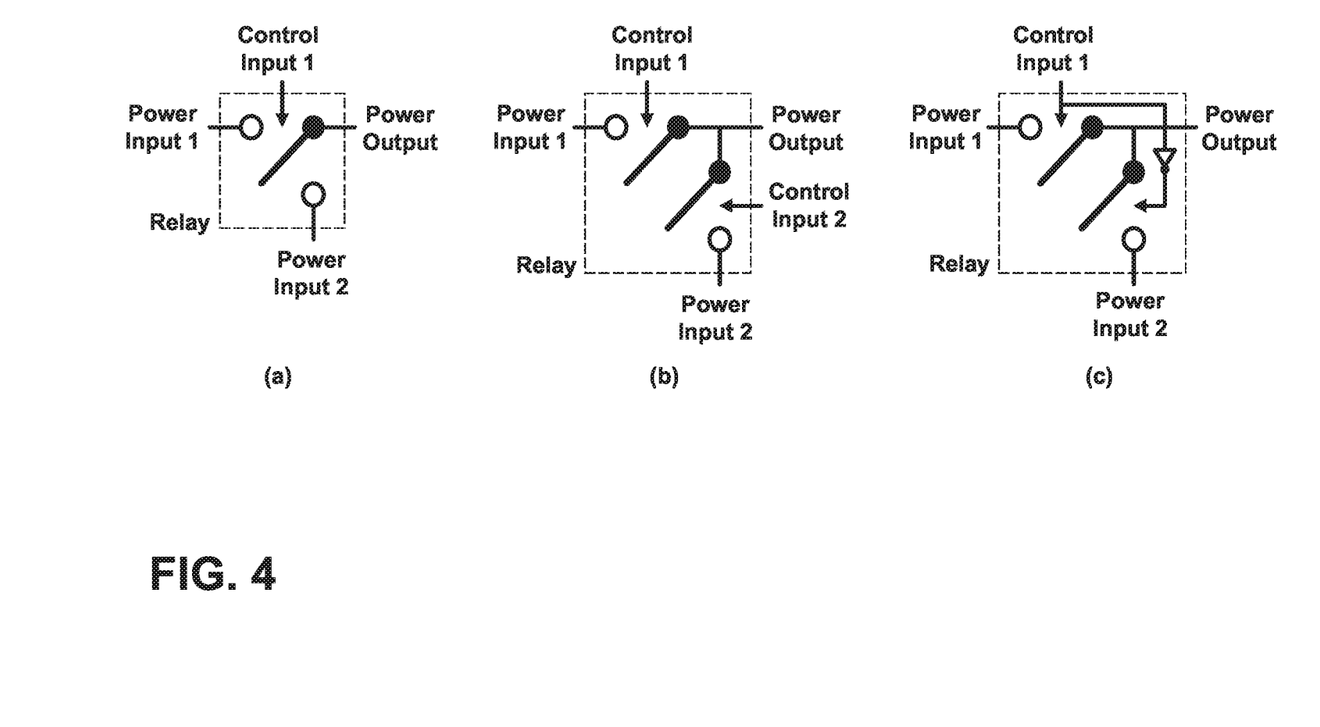
FIG. 4 includes three embodiments of a relay for disconnecting the electrical grid and connecting the filter capacitor.

The relay mechanism 24 may be any device that breaks the grid connection and simultaneously connects the filter capacitor. This may be realized with a single device, such as a single-pole, double-throw type mechanical relay, or with a combination of devices, such as complementary switched, solid-state or mechanical relays. FIG. 4 shows three device agnostic embodiments, in which a relay is made up of one or more devices. While either the grid, the filter capacitor, or neither may be connected to the DAB module 20, both being connected to the DAB simultaneously would be considered a fault condition. A relay in the form of FIG. 4(a) and FIG. 4(c) may be preferred for this reason.

Figure 5:
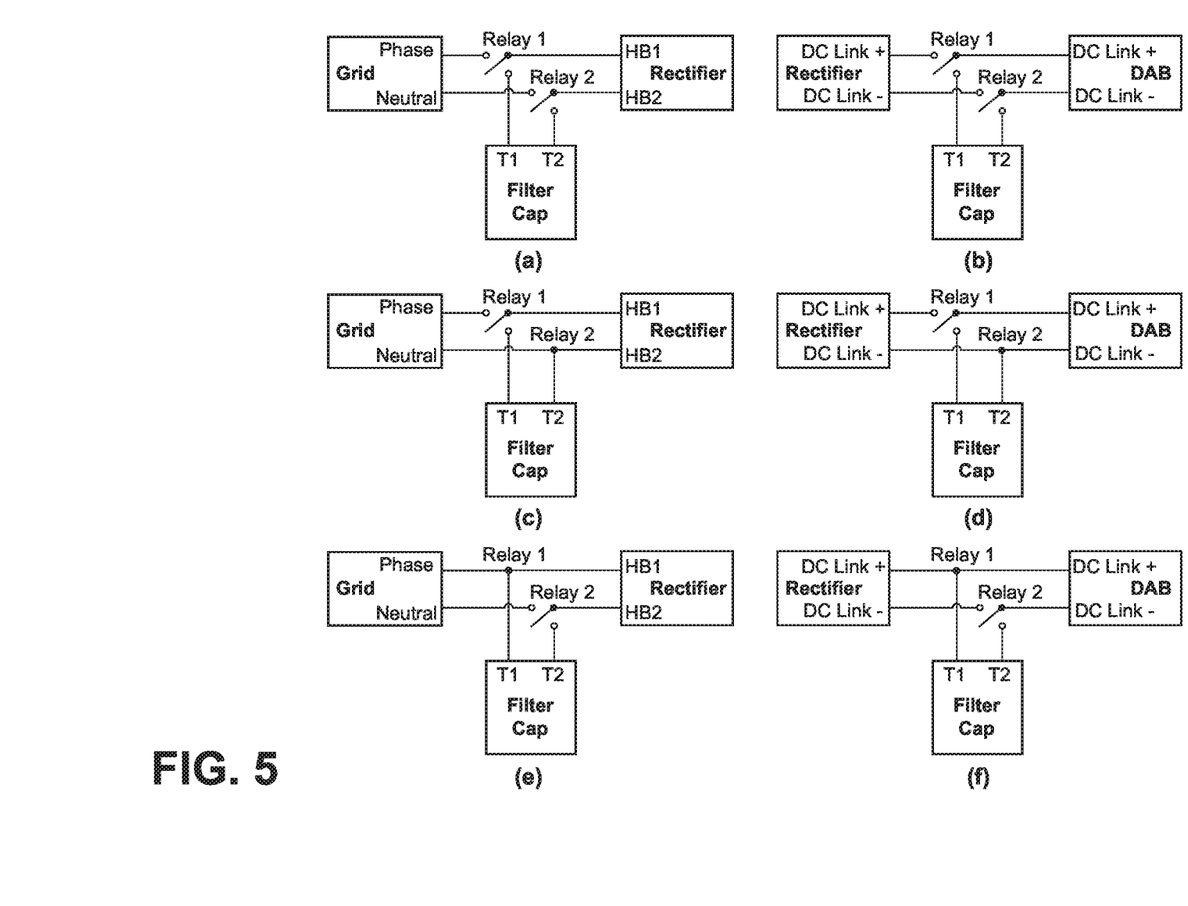
FIG. 5 includes six embodiments of relay placement to switch electrical connection to the DAB module between the electrical grid and the filter capacitor.
Figure 6:
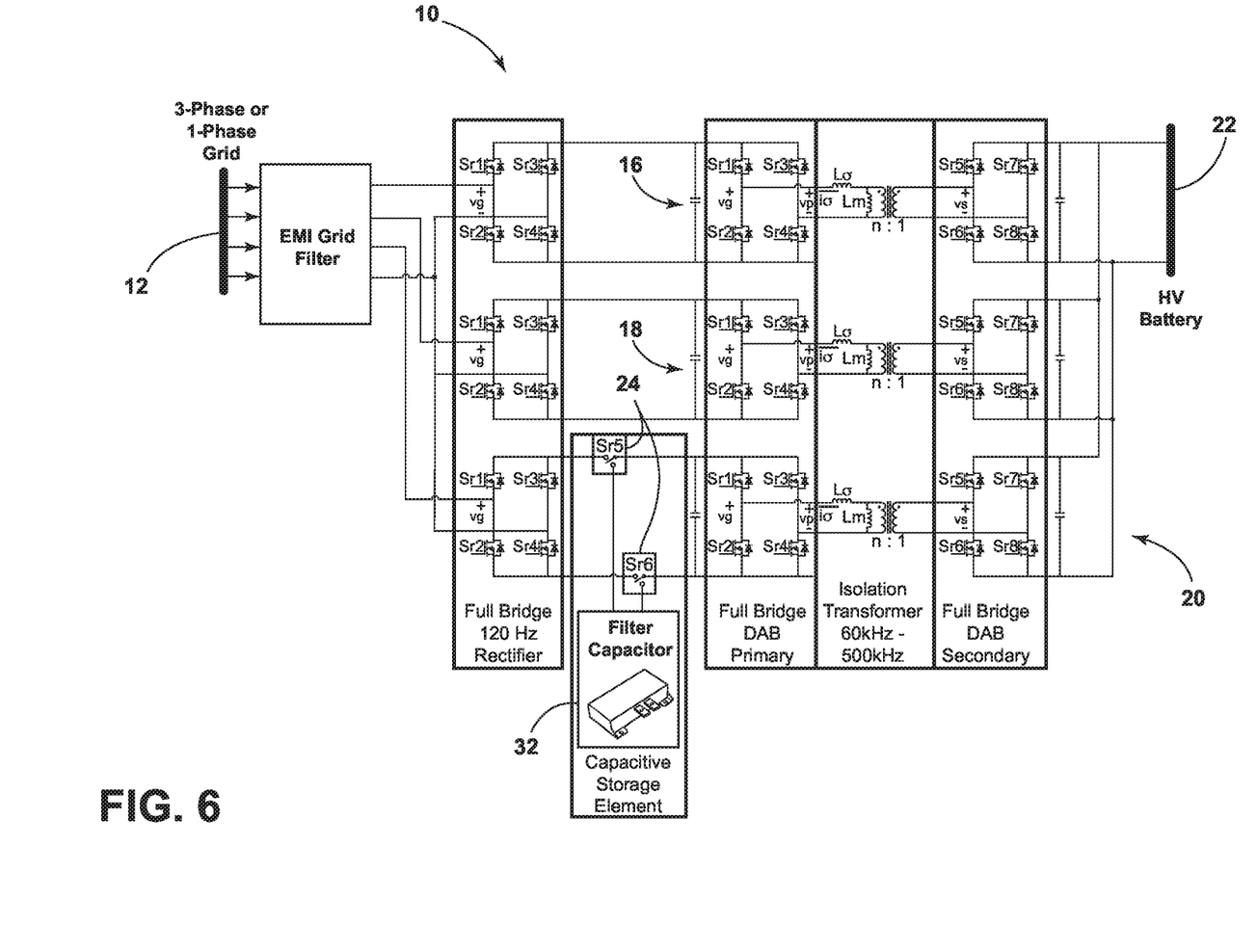
FIG. 6 is a circuit diagram of an on-board charger including a filter capacitor between a full bridge rectifier and a full-bridge DAB primary.
Figure 7:
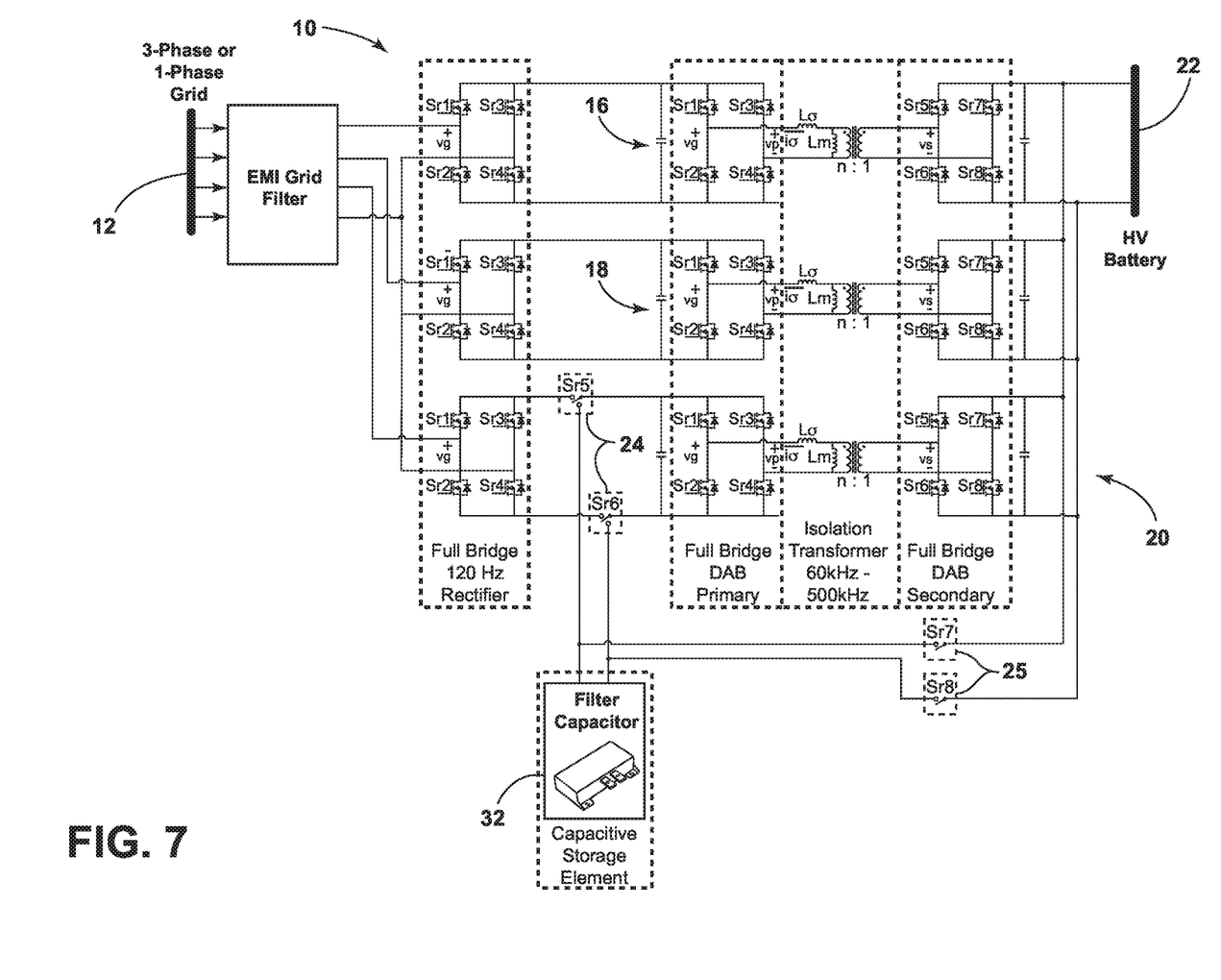
FIG. 7 is the circuit diagram of FIG. 6 including third and fourth relays coupled between the filter capacitor and the output.

Implementation of the relays may have a variety of embodiments since only the electrical circuit must be broken to disconnect either the grid or the filter capacitor, as opposed to all physical connections. FIG. 5 shows six embodiments of relay placement that will sufficiently break electrical connection to either the grid or the filter capacitor from the DAB module. FIGS. 5a, 5c, and 5e, while viable, are less desirable as the rectifier will add thermal losses during the active filter configuration that can be avoided by using the configures in FIGS. 5b, 5d, and 5f. Of those, FIG. 5d and FIG. 5f are most desirable from a cost and space optimization standpoint while FIG. 5b may be preferred from an isolation or EMI perspective. The embodiment of FIG. 1 shows the relay placement in FIG. 5d, while FIG. 6 shows the relay placement of FIG. 5b. FIG. 7 shows a further embodiment in which the filter capacitor 32 is coupled to the output rail voltage through third and fourth relays 25. In this embodiment, a total of four relays are used, which allow for the filter capacitor 32 to be switched between the output rail voltage in three-phase mode and the input DC linkage during single-phase mode. Consequently, the filter capacitor 32 is used both in three-phase operation and single-phase operation. In three-phase operation, switches Sr7 and Sr8 are closed such that the filter capacitor 32 reduces the output current ripple to the battery 22 and generally increases the ability to absorb transients on the grid so that they are not seen by the battery. In single-phase operations, switches Sr7 and Sr8 are open. The configuration in FIG. 7 therefore allows for maximum utilization of the filter capacitor 32 irrespective of the grid configuration. Depending upon the particular system, connecting the filter capacitor 32 to the output rail voltage could increase the output capacitance five to six times, while also greatly increasing the ability to supply transient demands on the output bus from other systems connected to the battery.

An additional advantage of placing the relays on the DC linkage between the unfolded rectifier and the DAB primary full-bridge is that it allows the rectifier to short its unused phase to neutral and add an additional conduction path to the neutral line. When switching from the three-phase and single-phase operation, if one DAB module is used as an active filter while the other two work in parallel to supply power to the output, the neutral connection must handle the return current of both phase connections. By shorting the neutral to the third, unused phase, through the unused rectifier, balance is restored between the neutral and phase connections.

Figure 8:
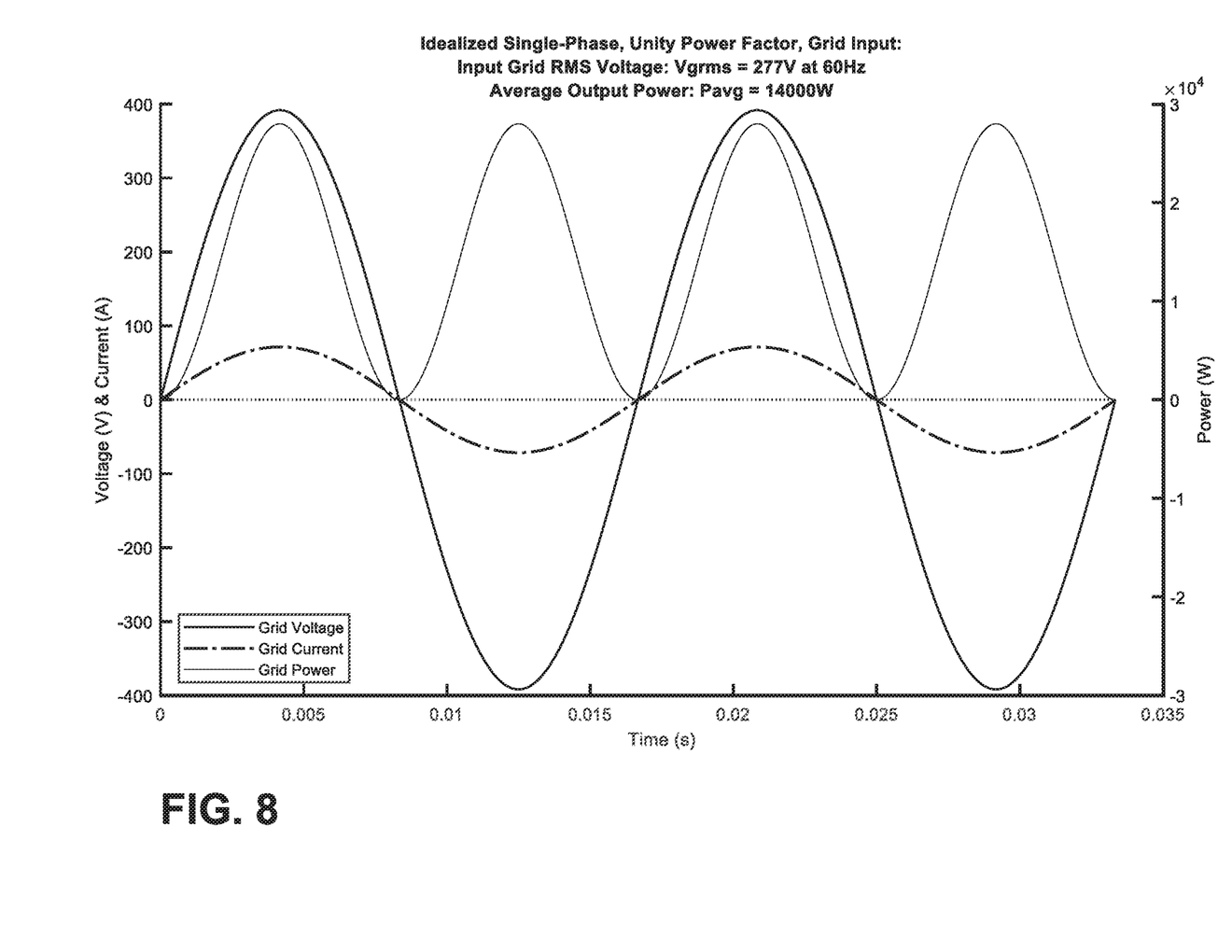
FIG. 8 is a graph of instantaneous grid voltage, current, and power sourced by a single phase of the grid under unity power-factor operation.
Figure 9:
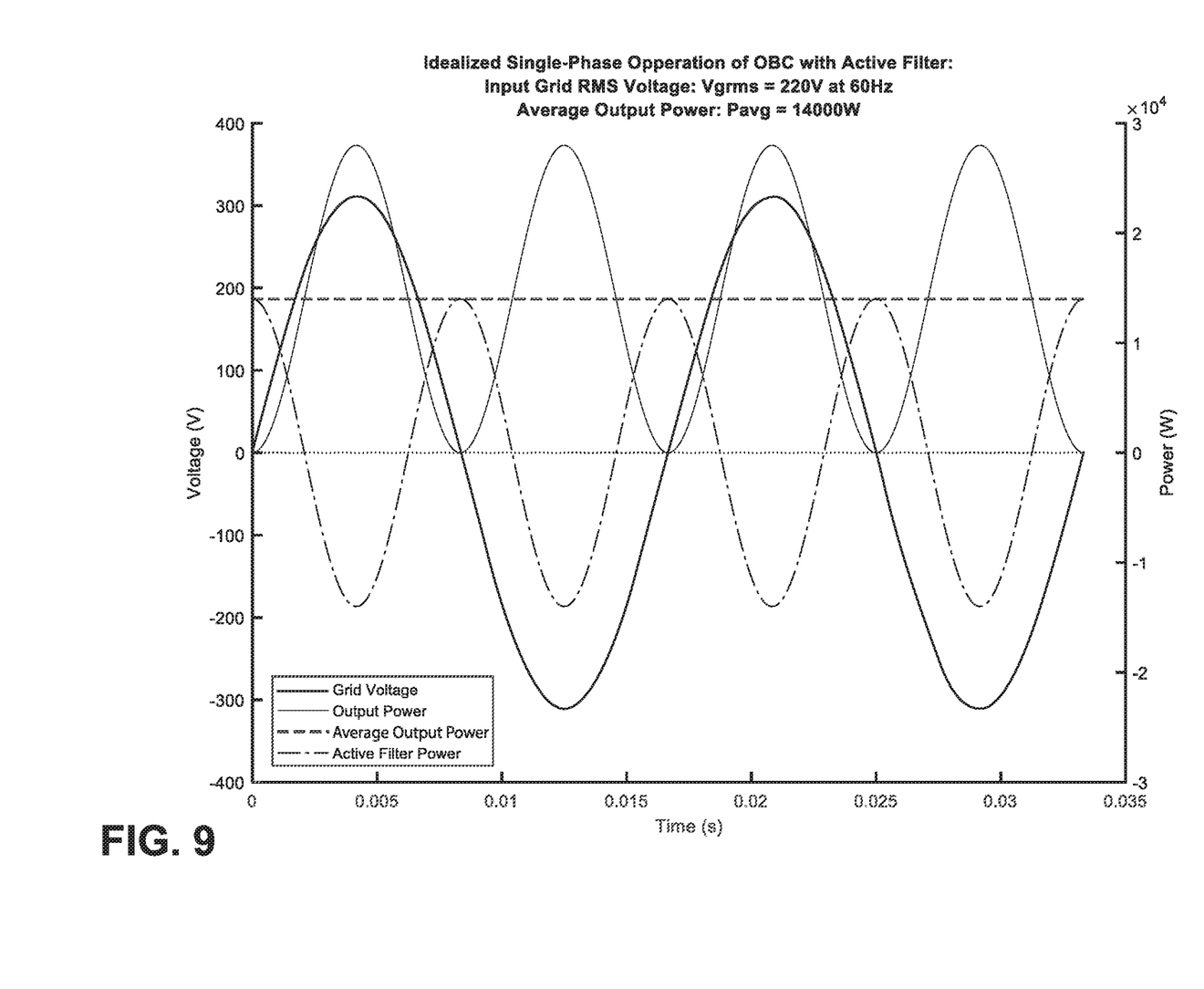
FIG. 9 is a graph of idealized operation of a three-phase/single-phase, single stage on-board charger, using one phase as an output active filter.

The principle of operation of the OBC 10 will now be described. The control algorithm used to modulate the power of each phase's DAB module allow the instantaneous power through each to be controlled to any reference waveform. Therefore, the power reference supplied to the third DAB module 20, being used as the active filter, need merely be formulated to destructively interfere with the undesired output harmonics created by the power modulation of the other DAB modules. To illustrate this concept, FIG. 8 shows the power command needed to draw 14 kW, average power, from a 277 $V_{RMS}$ single-phase grid with unity power factor. This would therefore be the power reference applied to the first two DAB modules (16), (18) in FIG. 1. Assuming an idealized system, the output power, $P_{out}$, would equal the input power, $P_{grid}$, as a 120 Hz sine wave with a 14 kW amplitude and 14 kW DC offset. The desired output power is the average power output, $P_{avg}$, plotted in FIG. 9. Therefore, the power that must be supplied to the output to cancel the output harmonic is $P_{act} = P_{avg} - P_{out}$. If $P_{out}$ is represented by the expression 14k*sin(120πt)+14 kW, and if $P_{avg}$ is represented by the expression 14 kW, then $P_{act}$ is equal to −14k*sin(120πt), which has an RMS value of $P_{avg}/\sqrt{2}$W and a net contribution of 0W. During the negative portion of $P_{act}$ in FIG. 9, the filter DAB module 20 is drawing power away from the output and storing that energy to the filter capacitor 32. This is the region in which the PFC DABS are supplying more power than the desired average. During the region where $P_{act}$ is positive, the filter DAB module 20 is pulling the stored energy out of the filter capacitor 32 and delivering it to the output. This is the region where the PFC DAB modules 16, 18 are delivering less power than desired. In this way, the load only sees the average power as the desired DC output.

The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. An on-board charger for a vehicle comprising:
   a first switch-mode converter being operable to convert a first rectified voltage into a first DC component;
   a second switch-mode converter being operable to convert a second rectified voltage into a second DC component;
   a third switch-mode converter being operable to convert a third rectified voltage into a third DC component, the third switch-mode converter being bidirectional such that the third switch-mode converter is operable as an active filter to remove harmonics from a DC output of the first and second switch-mode converters when coupled to a single-phase electrical grid, wherein the third switch-mode converter is a dual active bridge converter including a primary-side full bridge, an isolation transformer, and a secondary-side full bridge;
   a first rectifier, a second rectifier, and a third rectifier electrically coupled in series with the first switch-mode converter, the second switch-mode converter, and the third switch-mode converter, respectively; and
   a filter capacitor selectively coupled between the third rectifier and the primary-side full bridge of the third switch-mode converter via a relay, wherein the relay is configured to alternatively couple the primary-side full bridge of the third switch-mode converter to either of the third rectifier and the filter capacitor, and wherein the filter capacitor draws power from the DC output through the third switch-mode converter if the DC output is greater than a power reference and supplies power to the DC output through the third switch-mode converter if the DC output is less than the power reference.

2. The on-board charger of claim 1 wherein each of the first and second switch-mode converters includes a dual-active-bridge topology.

3. The on-board charger of claim 1 wherein the first rectifier, the second rectifier, and the third rectifier each include a full bridge topology.

4. The on-board charger of claim 1 further including a controller to detect a single-phase AC input voltage and a three-phase AC input voltage and to control operation of the relay.

5. The on-board charger of claim 4 wherein each of the first, second, and third switch-mode converters provide unity power factor when coupled to the three-phase AC input voltage.

6. The on-board charger of claim 4 wherein the third switch-mode converter is operated 180° out of phase relative to the first and second switch-mode converters when the single-phase AC input voltage is detected by the controller.

7. The on-board charger of claim 4 further including a voltage sensor across the filter capacitor, the voltage sensor being coupled to the controller.

8. The on-board charger of claim 1 wherein the power reference is selected such that the third switch-mode converter destructively interferes with the harmonics of the DC output.

9. A method for converting an AC input voltage into a DC output voltage comprising:
providing an on-board charger including a first rectifier, a second rectifier, and a third rectifier electrically coupled in series with a first switch-mode converter, a second switch-mode converter, and a third switch-mode converter, respectively, wherein the third switch-mode converter is a dual active bridge converter including a primary-side full bridge, an isolation transformer, and a secondary-side full bridge;
in response to a three-phase AC input being detected at the on-board charger, operating the first rectifier and the first switch-mode converter to convert a first phase of the AC input into a first DC component, operating the second rectifier and the second switch-mode converter to convert a second phase of the AC input into a second DC component, and operating the third rectifier and the third switch-mode converter to convert a third phase of the AC input into a third DC component; and
in response to a single-phase AC input being detected at the on-board charger, filtering a DC output of at least one of the first and second switch-mode converters through the third switch-mode converter to reduce harmonics in the DC output, wherein filtering the DC output includes de-coupling the third switch-mode converter from the third rectifier and coupling an input stage of the third switch-mode converter to a filter capacitor via a relay, the filter capacitor being coupled between the third rectifier and the primary-side full bridge of the third switch-mode converter, wherein the relay is configured to alternatively couple the primary-side full bridge of the third switch-mode converter to either of the third rectifier and the filter capacitor, such that the filter capacitor draws power from the DC output if the DC output is greater than a power reference and supplies power to the DC output if the DC output is less than the power reference.

10. The method of claim 9 wherein the first rectifier, the second rectifier, and the third rectifier each include a full bridge topology.

11. The method of claim 9 wherein the first switch-mode converter and the second switch-mode converter each include a dual-active-bridge topology.

12. The method of claim 9 wherein the filter capacitor includes a capacitor bank.

13. The method of claim 9 further including coupling the DC output of the on-board charger to a vehicle battery.

14. The method of claim 9 further including coupling the filter capacitor to a DC output of the on-board charger through first and second switches when a three-phase AC input is detected to reduce current ripple in the DC output of the on-board charger.

15. The method of claim 14 further including decoupling the filter capacitor from the DC output of the on-board charger through the first and second switches when a single-phase AC input is detected.

\* \* \* \* \*